United States Patent
Katz et al.

(10) Patent No.: US 10,001,834 B2
(45) Date of Patent: *Jun. 19, 2018

(54) CALIBRATION OF MULTIPLE RIGID BODIES IN A VIRTUAL REALITY SYSTEM

(71) Applicant: Oculus VR, LLC, Menlo Park, CA (US)

(72) Inventors: Dov Katz, Irvine, CA (US); Jonathan Shine, Santa Ana, CA (US); Robin Michael Miller, Redmond, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/402,422

(22) Filed: Jan. 10, 2017

(65) Prior Publication Data

US 2017/0147066 A1 May 25, 2017

Related U.S. Application Data

(63) Continuation of application No. 14/589,774, filed on Jan. 5, 2015, now Pat. No. 9,600,925.

(Continued)

(51) Int. Cl.
*G06T 11/00* (2006.01)
*G02B 27/01* (2006.01)
(Continued)

(52) U.S. Cl.
CPC ............. *G06F 3/012* (2013.01); *G06T 7/74* (2017.01); *G06T 7/75* (2017.01); *G06T 2207/10016* (2013.01); *G06T 2207/30204* (2013.01)

(58) Field of Classification Search
CPC ....................................................... G06F 3/012
See application file for complete search history.

(56) References Cited

U.S. PATENT DOCUMENTS 8,678,282 B1 3/2014 Black et al.
9,524,580 B2 12/2016 Katz et al.
(Continued)

FOREIGN PATENT DOCUMENTS

JP 2005-107247 A 4/2005
JP 2007-071782 A 3/2007
(Continued)

OTHER PUBLICATIONS

Chinese First Office Action, Chinese Application No. 201580003318.8, dated Apr. 5, 2017, 13 pages.
(Continued)

*Primary Examiner* — Md Saiful A Siddiqui
(74) *Attorney, Agent, or Firm* — Fenwick & West LLP

(57) ABSTRACT

A virtual reality (VR) console receives slow calibration data from an imaging device and fast calibration data from an inertial measurement unit on a VR headset including a front and a rear rigid body. The slow calibration data includes an image where only the locators on the rear rigid body are visible. An observed position is determined from the slow calibration data and a predicted position is determined from the fast calibration data. If a difference between the observed position and the predicted position is greater than a threshold value, the predicted position is adjusted by a temporary offset until the difference is less than the threshold value. The temporary offset is removed by re-calibrating the rear rigid body to the front rigid body once locators on both the front and rear rigid body are visible in an image in the slow calibration data.

20 Claims, 7 Drawing Sheets

Related U.S. Application Data

(60) Provisional application No. 62/088,088, filed on Dec. 5, 2014, provisional application No. 62/088,085, filed on Dec. 5, 2014, provisional application No. 61/923,895, filed on Jan. 6, 2014.

(51) Int. Cl.
*G06F 3/01* (2006.01)
*G06T 7/73* (2017.01)

(56) References Cited

U.S. PATENT DOCUMENTS

| | | |
|---|---|---|
| 2004/0051680 A1 | 3/2004 | Azuma et al. |
| 2004/0080467 A1 | 4/2004 | Chinthammit et al. |
| 2005/0069174 A1 | 3/2005 | Uchiyama et al. |
| 2006/0232665 A1* | 10/2006 | Schowengerdt ... G02B 27/0093 348/51 |
| 2008/0292131 A1 | 11/2008 | Takemoto et al. |
| 2009/0147993 A1 | 6/2009 | Hoffmann et al. |
| 2012/0242560 A1 | 9/2012 | Nakada et al. |
| 2013/0128364 A1* | 5/2013 | Wheeler ............... A61B 3/113 359/630 |
| 2013/0285885 A1 | 10/2013 | Nowatzyk et al. |
| 2014/0333665 A1 | 11/2014 | Sylvan et al. |
| 2014/0361977 A1* | 12/2014 | Stafford ............ G02B 27/0093 345/156 |
| 2014/0362110 A1* | 12/2014 | Stafford ................. G06F 3/013 345/633 |
| 2015/0185018 A1* | 7/2015 | Hesch ................. G01C 21/165 701/501 |
| 2015/0193949 A1 | 7/2015 | Katz et al. |
| 2015/0193983 A1 | 7/2015 | Katz et al. |
| 2015/0261291 A1 | 9/2015 | Mikhailov et al. |
| 2016/0012643 A1 | 1/2016 | Kezele et al. |

FOREIGN PATENT DOCUMENTS

| | | |
|---|---|---|
| JP | 2008-289645 A | 12/2008 |
| JP | 2013-258614 A | 12/2013 |
| JP | 2013-258614 A | 12/2016 |
| JP | 2016-543235 A | 4/2017 |
| WO | WO 2015/139005 A1 | 9/2015 |

OTHER PUBLICATIONS

European Partial Supplementary Search Report, European Application No. 15733225.5, dated May 26, 2017, 12 pages.
European Extended Search Report, European Application No. 15733225.5, dated Aug. 28, 2017, 11 pages.
PCT International Search Report and Written Opinion for PCT/US2015/010344, dated Mar. 30, 2015, 8 Pages.
IP Australia, Examination Report No. 1, Australian Patent Application No. 2015203932, dated Feb. 10, 2017, two pages.
Korean Intellectual Property Office, Notice of Preliminary Rejection, Korean Patent Application No. 10-2016-70017722, dated Feb. 8, 2017, five pages.
United States Office Action, U.S. Appl. No. 14/589,774, dated May 6, 2016, twenty-seven pages.
Chinese Second Office Action, Chinese Application No. 201580003318.8, dated Aug. 2, 2017, 7 pages.
Japanese First Office Action, Japanese Application No. 2017-044754, dated Oct. 3, 2017, 6 pages.

* cited by examiner

CALIBRATION OF MULTIPLE RIGID BODIES IN A VIRTUAL REALITY SYSTEM

CROSS-REFERENCE TO RELATED APPLICATIONS

This application is a continuation of U.S. application Ser. No. 14/589,774, filed Jan. 5, 2015, which claims the benefit of U.S. Application No. 62/088,088, filed Dec. 5, 2014, U.S. Provisional Application No. 62/088,085, filed Dec. 5, 2014, and U.S. Provisional Application No. 61/923,895, filed on Jan. 6, 2014, all of which are incorporated by reference in their entirety.

BACKGROUND

The present disclosure generally relates to calibration systems, and more specifically relates to calibrating virtual reality systems.

Virtual reality (VR) devices include components for determining position and movement of a headset worn by a user. These components need to be calibrated at various times, initially due to manufacturing tolerances and subsequently due to normal use of the system. Operating improperly calibrated VR device may result in improper tracking of the position or motion of the headset, which causes a dissonance between user motion and media presented to the user via the headset. Moreover, one or more of the components determining headset position and movement can lose calibration over time or with use. For example, changes in temperature or vibration may cause a camera imaging the motion of the headset to lose calibration.

SUMMARY

A virtual reality (VR) headset of a VR system includes a front rigid body and a rear rigid body, which are non-rigidly coupled together. For example, the front rigid body is coupled to the rear rigid body by an elastic headband, so the VR system continues to detect movement of an entity wearing the VR headset when the front rigid body is directed away from an imaging device included in the VR system. Both the front rigid body and the rear rigid body include locators for tracking the position of the VR headset. A locator is an object located in a specific position on the VR headset relative to one or more components, such as another locator, of the VR headset and relative to a reference point on the VR headset. Because the relationship between the front and rear rigid bodies is not necessarily fixed, the VR system may lose tracking of the position of the front rigid body relative to the rear rigid body, causing the VR system to recalibrate to re-acquire tracking of the VR headset. In some embodiments, the VR console determines subsequent predicted positions of the rear rigid body for times after the particular image time value of the image in the slow calibration data including only locators from the rear rigid body using the fast calibration data and the position vector adjusted by the offset value until re-calibration between the front rigid body to the rear rigid body can occur.

The VR system recalibrates itself when the tracking of the position of the front rigid body or the position of the rear rigid body is lost. For example, VR the system determines when to recalibrate based on a measured difference between the estimated positions of locators on the rear body and intermediate estimated positions of a reference point on the front rigid body determined by an inertial measurement unit (IMU) within the first rigid body based on data from one or more position sensors (e.g., accelerometers, gyroscopes) included in the first rigid body. An intermediate estimated position of the reference point is a position determined from the fast calibration data and may be associated with a time associated with an image, or a time between times associated with an image and a subsequent image from the slow calibration data.

In some embodiments, a VR console included in the VR system receives slow calibration data including a series of images of the VR headset taken at image time values from an imaging device. At least one image of the series of images includes only the locators on the rear rigid body and is associated with a particular image time value. Additionally, the VR console receives fast calibration data from the IMU comprising one or more intermediate estimated positions of a reference point of the front rigid body of the VR headset determined from one or more position sensors included in the front rigid body of the VR headset. The VR console determines an observed position of the rear rigid body for the particular image time value using the slow calibration data and determines a predicted position of the rear rigid body for the image time value associated with the image including locators from only the rear rigid body of the VR headset using the fast calibration data as well as a position vector describing a calibrated offset between the front rigid body and the rear rigid body.

The VR console determines a difference between the observed position of the rear rigid body and the predicted position of the rear rigid body. If the difference is greater than a threshold value, the VR console adjusts the predicted position of the rear rigid body by a temporary offset value so the difference between the observed position of the rear rigid body and the predicted position of the rear rigid body is less than the threshold value. In some embodiments, the VR console determines subsequent predicted positions of the rear rigid body for times after the particular image time value of the image in the slow calibration data including only locators from the rear rigid body using the fast calibration data and the position vector adjusted by the offset value until re-calibration between the front rigid body to the rear rigid body can occur.

Re-calibration uses at least one image from the slow calibration data having a time after the particular time of the image including only the locators on the rear rigid body and that includes at least a front threshold number of observed locators on the front rigid body and a rear threshold number of observed locators on the rear rigid body. The VR console identifies model locators corresponding to observed locators from images in the slow calibration data using a headset model of the VR headset. For example, the VR console extracts locator information from the images in the slow calibration data, the locator information describing positions of observed locators on the VR headset relative to each other in a given image. In at least one of the images from the slow calibration data the VR console identifies model locators that correspond to observed locators on both the front rigid body and on the rear rigid body. The VR console compares the locator information with a headset model to identify the model locators corresponding to the observed locators.

Based on the locator information, the VR console generates estimated positions for the observed locators using the headset model. For example, the VR console uses the headset model and the information identifying positions of the observed locators to determine a projection matrix for translating translate ideal positions (described by the headset model) to positions on the image plane (described by the images of the observed locators) of the imaging device. The VR console uses the projection matrix to estimate positions of the observed locators. The VR console uses the projection matrix to estimate positions of the observed locations, and adjusts one or more calibration parameters to adjust one or more of the estimated positions of observed locators on the front rigid body until a relative distance between adjusted estimated positions of observed locators on the front rigid body and their corresponding positions determined by the headset model observed locations is than a threshold value. Similarly, the VR console determines estimated positions of observed locators on the rear rigid body and adjusts the estimated positions of the observed locations on the rear rigid body as described above. Based on adjusted estimated positions of the observed locators on the first rigid body, the VR console determines calibrated positions of the reference point of the first rigid body for one or more images from the slow calibration data.

The VR console determines a position of the rear rigid body relative to the reference point of the first rigid body. For example, the VR console identifies a rear reference point on the rear rigid body using the adjusted estimated positions of the observed locators on the rear rigid body. The VR console then identifies a position of the rear reference point relative to the reference point on the front rigid body. In alternate embodiments, the VR console identifies the position of each observed locator on the rear rigid body relative to the reference point on the front rigid body. The VR console additionally adjusts one or more calibration parameters so intermediate estimated positions of the reference point on the front rigid body and/or the rear reference point are within a threshold value of predicted positions of the reference point on the front rigid body and/or the rear reference point determined from the calibrated position of the reference point on the front rigid body and/or the calibrated position of the rear reference point (e.g., via curve fitting) from the slow calibration data.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Architecture

Figure 1:
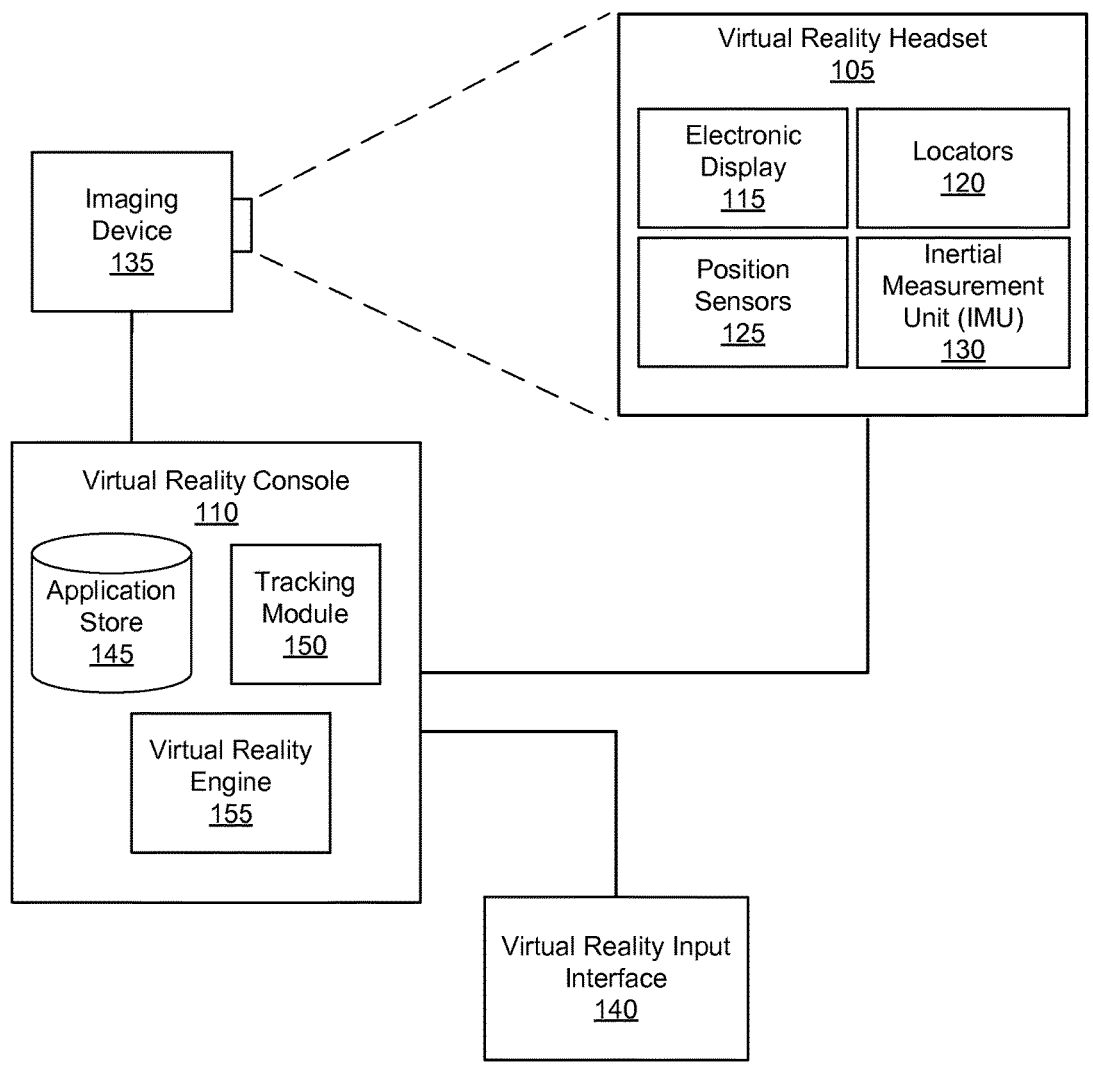
FIG. 1 is a block diagram of a system environment in which a virtual reality console operates, in accordance with an embodiment.

FIG. 1 is a block diagram of one embodiment of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. Example embodiments of the VR headset 105 are further described below in conjunction with FIGS. 2A and 2B.

In various embodiments, the VR headset 105 may comprise one or more rigid bodies, which may be rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other. An embodiment of the VR headset 105 that includes two rigid bodies that are non-rigidly coupled together is further described below in conjunction with FIG. 2B.

The VR headset 105 includes an electronic display 115, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof. Additionally, the electronic display 115 may be associated with one or more optical components correcting one or more types of optical error (e.g., field curvature, astigmatism, barrel distortion, pincushion distortion, chromatic aberration, chromatic aberration, etc.). In some embodiments, the media provided to the electronic display 115 for presentation to the user is pre-distorted to aid in correction of one or more types of optical errors. Additionally, the optical components may increase a field of view of the displayed media through magnification or through another suitable method. For example, the field of view of the displayed media is such that the displayed media is presented using almost all (e.g., 110 degrees diagonal), and in some cases all, of the user's field of view.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, or any other suitable type of sensor, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point (e.g., intermediate estimated position) on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter (e.g., IMU parameters), the IMU 130 may adjust its operation (e.g., change sample rate, etc.). In some embodiments, as further described below, certain calibration parameters cause the IMU 130 to offset an estimated position of the VR headset 105 to correct positional errors that may occur when only certain portions of the VR headset 105 are visible to the imaging device 135. In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ration). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110. The imaging device 135 receives one or more calibration parameters from the VR console 110, and may adjust one or more imaging parameters (e.g., focal length, focus, frame rate, ISO, sensor temperature, shutter speed, aperture, etc.) based on the calibration parameters.

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes a media store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates media for presentation to the user. Media generated by an application may be in response to inputs received from the user via movement of the HR headset 105 or the VR interface device 140. Examples of applications include: gaming applications, conferencing applications, video playback application, or other suitable applications.

The tracking module 150 calibrates the system environment 100 using one or more calibration parameters. As further described in conjunction with FIGS. 3-5, the tracking module 150 may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also account s for information received from the IMU 130. Additionally, as discussed in further detail below in conjunction with FIGS. 4 and 5, if that tracking of the VR headset 105 is lost (e.g., the imaging device 135 loses line of sight of at least a threshold number of the locators 120), the tracking module 140 re-calibrates some or all of the system environments 100. As used herein, "loss of tracking" may generally refer to a loss of calibration of the imaging device 135 or the IMU 130, a loss of relative positions of one or more rigid bodies in the VR headset 105, a loss of position of the VR headset 105 relative to the imaging device 135, or some combination thereof.

Re-calibration of the system environment 100 is generally transparent to the user. In some embodiments, the tracking module 150 may prompt the user to move the VR headset 105 to an orientation where one or more sides of the VR headset 105 are visible to the imaging device 135. For example, the tracking module 150 prompts the user to look up, to look down, to look left, to look right, or look in another specified direction so one or more sides of the VR headset 105 are visible to the imaging device 135. Once a threshold number of locators 120 on the VR headset 105 are imaged by the imaging device 135, the tracking module 150 re-establishes calibration. In some embodiments, the tracking module 150 may continually calibrate the system environment 100 or calibrates the system environment 100 at periodic intervals to maintain accurate tracking of the VR headset 105.

Figure 2A:
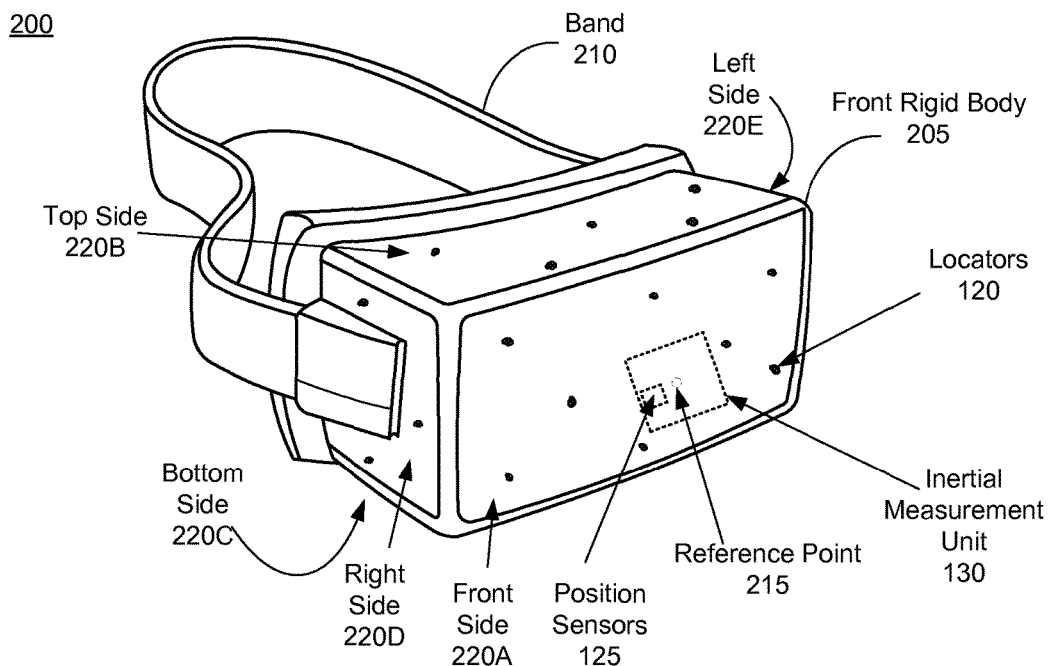
FIG. 2A is a wire diagram of a virtual reality headset, in accordance with an embodiment.
Figure 2B:
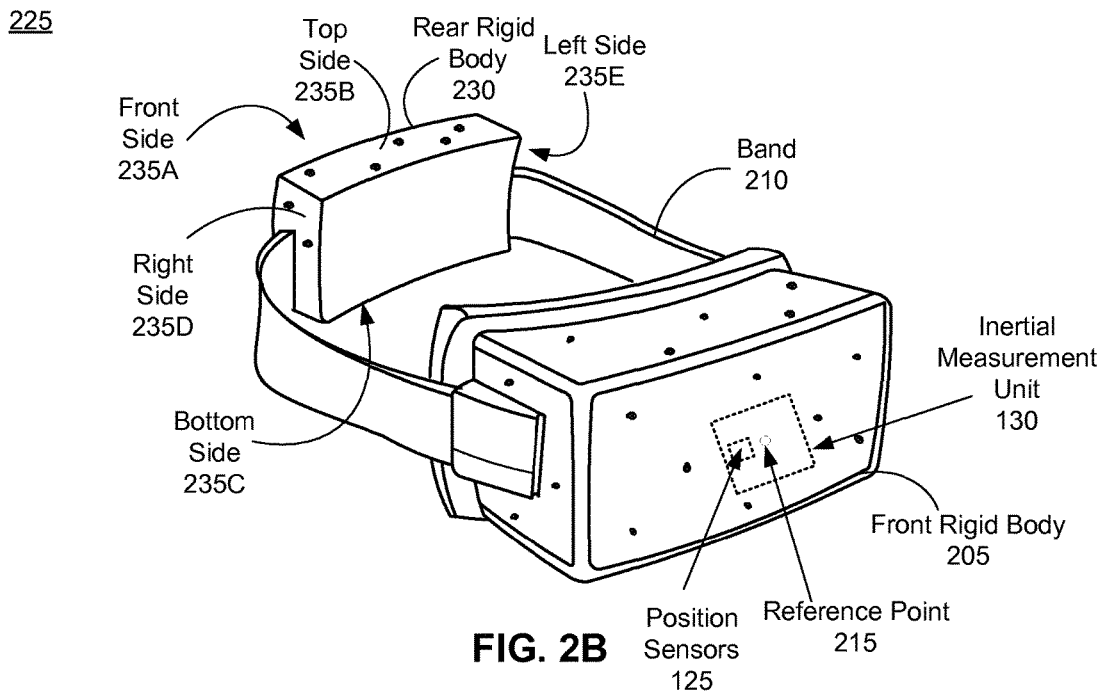
FIG. 2B is a wire diagram of a virtual reality headset including a front rigid body and a rear rigid body, in accordance with an embodiment.

The tracking module 150 may calibrate a system environment 100 including a VR headset 105 comprising one or more rigid bodies (e.g., see FIGS. 2A and 2B). Additionally, as further described below in conjunction with FIGS. 3 and 5, the calibration may account for a VR headset 105 including two rigid bodies that are non-rigidly coupled (e.g., coupled together via an elastic band). The two rigid bodies may be a front rigid body including the IMU 130 that is positioned in front of the user's eyes, and a rear rigid body that is positioned at the rear of the user's head. This configuration of the front rigid body and the rear rigid body allows a user to turn 360 degrees relative to the imaging device 135. However, because the relationship between the front rigid body and the rear rigid body is not necessarily fixed, the system environment 100 may lose calibration of the position of the front rigid body relative to the rear rigid body. Moreover as discussed in detail below with regard to FIG. 6, in some embodiments, if tracking is lost between multiple rigid bodies in the VR headset 105, the tracking module 150 may offset the position of a rigid body until re-calibration may occur. In these instances, in some embodiments, the tracking module 150 may determine an offset value to the intermediate estimated position of the VR headset 105 and provide it to the IMU 130 as a calibration parameter. Alternatively, the tracking module 150 may adjust a position vector describing the relative position of the front rigid body to the rear rigid body by the offset value. In some embodiments, the tracking module 150 determines when to re-calibrate based on a measured difference between the movement indicated by the locators 120 on the rear rigid body and the movement predicted using fast calibration data received from the IMU 130. The tracking module 150 re-calibrates using slow calibration data including one or more images that include locators 120 on the front rigid body and locators on the rear rigid body.

Additionally, the tracking module 150 tracks movements of the VR headset 105 using slow calibration data from the imaging device 13. As further described below in conjunction with FIG. 3, the tracking module 150 determines positions of a reference point of the VR headset 105 using observed locators from the slow calibration data and a model of the VR headset 105. The tracking module 150 also determines positions of a reference point of the VR headset 105 using position information from the fast calibration data. Additionally, in some embodiments, the tracking module 150 may use portions of the fast calibration data, slow calibration data, or some combination thereof, to predict a future location of the headset 105. The tracking module 150 provides the estimated or predicted future position of the VR headset 105 to the VR engine 155.

The VR engine 155 executes applications within the system environment and receives position information, acceleration information, velocity information, predicted future positions, or some combination thereof, of the VR headset 105 from the tracking module 150. Based on the received information, the VR engine 155 determines media to provide to the VR headset 105 for presentation to the user. For example, if the received information indicates that the user has looked to the left, the VR engine 155 generates media for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

FIG. 2A is a wire diagram of one embodiment of a virtual reality headset. The VR headset 200 is an embodiment of the VR headset 105 and includes a front rigid body 205 and a band 210. The front rigid body 205 includes the electronic display 115 (not shown), the IMU 130, the one or more position sensors 125, and the locators 120. In the embodiment shown by FIG. 2A, the position sensors 125 are located within the IMU 130, and neither the position sensors 125 nor the IMU 130 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

FIG. 2B is a wire diagram of an embodiment of a VR headset 225 including a front rigid body 205 and a rear rigid body 230. The VR headset 225 shown in FIG. 2B, is an embodiment of the VR headset 105 where the front rigid body 205 and the rear rigid body 230 are coupled together via the band 210. The band 210 is non-rigid (e.g., elastic), so the front rigid body 205 is not rigidly coupled to the rear rigid body 210. Thus, the rear rigid body 230 may move in relation to the front rigid body 205, and, specifically, move in relation to the reference point 215. As further discussed below in conjunction with FIGS. 3 and 5, the rear rigid body 230 allows the VR console 110 to maintain tracking of the VR headset 105, even if the front rigid body 205 is not visible to the imaging device 135. Locators 120 on the rear rigid body 230 are located in fixed positions relative to one another and relative to the reference point 215 on the front rigid body 205. In the example of FIG. 2B, one or more locators 120, or portions of locators 120, on the rear rigid body 230 are located on a front side 235A, a top side 235B, a bottom side 235C, a right side 235D, and a left side 235E of the rear rigid body 230.

Figure 3:
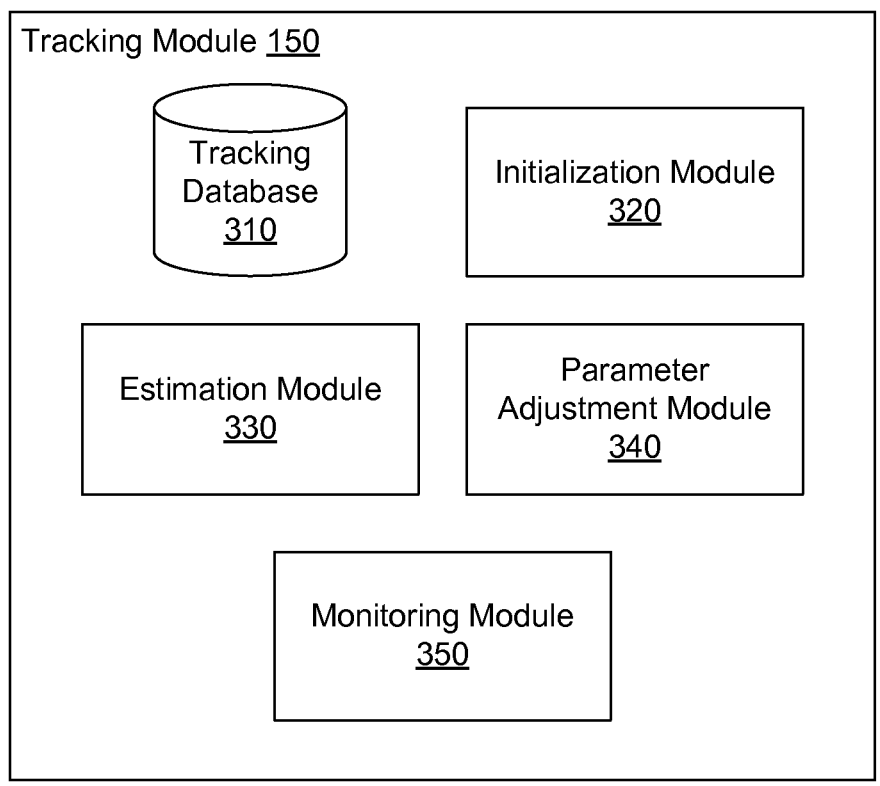
FIG. 3 is a block diagram of a tracking module of a virtual reality console, in accordance with an embodiment.

FIG. 3 is a block diagram of one embodiment of the tracking module 150 included in the VR console 110. Some embodiments of the tracking module 150 have different modules than those described herein. Similarly, the functionality described in conjunction with FIG. 3 may be distributed among the components in a different manner than described herein. In the example of FIG. 3, the tracking module 150 includes a tracking database 310, an initialization module 320, an estimation module 330, a parameter adjustment module 340, and a monitoring module 350.

The tracking database 310 stores information used by the tracking module 150 to track one or more VR headsets 105. For example, the tracking database 310 stores one or more headset models, one or more calibration parameter values, or any other suitable information to track a VR headset 105. As reference above with respect to FIG. 1, a headset model describes ideal positions of each of the locators 120 with respect to each other and the reference point 215. Each locator 120 is associated with a corresponding model locator in the headset model; hence, a model locator corresponding to a locator 120 describes an ideal position of the locator 120 according to the headset model. Additionally, the headset model may include information describing changes in model positions of the locators 120 or the reference point 215 as a function of different calibration parameters. In some embodiments, the headset model may describe model positions of locators 120 on a rear rigid body 230 with respect to each other, model positions of a rear reference point describing a position of the rear rigid body 230, default positions of the rear reference point relative to a reference point 215 on the front rigid body 205, default positions of the model locations of locators 120 on the rear rigid body 230 relative to the reference point 215, or some combination thereof.

Calibration parameters are parameters that may be adjusted to affect calibration of the VR headset 105. Example calibration parameters include imaging parameters, IMU parameters, or some combination thereof. Imaging parameters and IMU parameters may be included in the calibration parameters. Examples of imaging parameters include: focal length, focus, frame rate, ISO, shutter speed, aperture, camera orientation, source activation (in embodiments where the imaging device 135 uses a source to illuminate reflective locators 120), offset of an imaging sensor with respect to the center of a lens of the imaging device 135, lens distortion parameters, sensor temperature, or any other parameter used by the imaging device 135 to output slow calibration data. IMU parameters are parameters controlling collection of the fast calibration data. Examples of IMU parameters include: a sample rate of one or more of the measurement signals from the position sensors 125, an output rate of the fast calibration data, other suitable parameters used by the IMU 130 to generate fast calibration data, commands to power the IMU 130 on or off, commands to update the initial position to the current position of the reference point, offset information (e.g., offset to positional information), or any other suitable information.

The initialization module 320 initializes the system environment 100 using information from the tracking database 310, such as calibration parameters retrieved from the tracking database 310. In embodiments where the system environment 100 was not previously calibrated default calibration parameters are retrieved from the tracking database 310. If the system environment 100 was previously calibrated, adjusted calibration parameters may be retrieved from the tracking database 310. The initialization module 320 provides the retrieved calibration parameters to the IMU 130 and/or to the imaging device 130.

The estimation module 330 receives slow calibration data and/or fast calibration data from the VR headset 105 and/or from the IMU 130. The slow calibration data is received from the imaging device 135 at a slow data rate (e.g., 20 Hz). In contrast, the fast calibration data is received from the IMU 130 at a data rate (e.g., 200 Hz or more) that is significantly faster than the data rate at which the slow calibration data is received. Thus, the fast calibration data may be used to determine position information of the VR headset 105 between images of the VR headset 105 included in the slow calibration data.

Using a headset model from the tracking database 310 and the slow calibration data from the imaging device 135, the estimation module 330 identifies model locators corresponding to one or more locators on the VR headset 135 identified from images captured by the imaging device 135. The estimation module 330 extracts locator information from the images in the slow calibration data, the locator information describing positions of observed locators 120 relative to each other in a given image. For a given image, the locator information describes relative positions between the observed locators 120 in the image. For example, if an image shows observed locators A, B, and C, the locator information includes data describing the relative distances between A and B, A and C, and B and C. As described above, the headset model includes one or more model positions for the locators on the VR headset 105. The estimation model 330 compares the relative positions of the observed locators 120 to the relative positions of the model locators to determine correspondences between observed locators 120 on the VR headset 105 and model locators from the headset model. In embodiments where calibration is occurring for a VR headset 225 including multiple rigid bodies, model locators corresponding to observed locators on both the front rigid body 205 and the rear rigid body 230 are identified from at least one of the images of slow calibration data.

Additionally, based on the headset model and the information describing model locators and observed locators 120, the estimation module 330 generates estimated positions for observed locators 120. The estimation module 330 determines a projection matrix based on the headset model and the information describing model locators and observed locators 120. The projection matrix is a mathematical construct that translates ideal positions of locators 120, described by the headset model, to positions on an image plane, described by the images of the observed locators 120, of the imaging device 135. Thus, the estimation module 330 estimates positions of observed locators 120 using the projection matrix and positions of model locators described in the headset model. One or more calibration parameters may be applied to the projection matrix so adjustments to one or more of the calibration parameters modify the estimated positions of the observed locators 120.

The estimation module 330 also extracts intermediate position information, intermediate velocity information, intermediate acceleration information, or some combination thereof, from the fast calibration data. As the fast calibration data is received more frequently than the slow calibration data, information extracted from the fast calibration data allows the estimation module 330 to determine position information, velocity information, or acceleration information for time periods between images from the slow calibration data. An intermediate estimated position information (e.g., an intermediate estimated position) describes a position of the reference point 215 at a time associated with an image, or a time between times associated with an image and a subsequent image from the slow calibration data. Intermediate velocity information describes a velocity vector associated with the reference point 215 at a time between a time associated with an image and a time associated with a subsequent image from the slow calibration data. Intermediate acceleration information describes an acceleration vector associated with the reference point 215 at a time between a time associated with an image and a time associated with a subsequent image from the slow calibration data. In some embodiments, the estimation module 330 is configured to obtain the intermediate estimated position information using the intermediate acceleration information or from the intermediate velocity information. The estimation module 330 provides the intermediate position to the parameter adjustment module 340.

The parameter adjustment module 340 adjusts one or more calibration parameters to adjust the estimated positions until relative distances between the adjusted estimated positions of the observed locators 120 and positions of their corresponding model locators are less than a threshold value. If a relative distance between an estimated position of an observed locator 120 and a position of its corresponding model locator equals or exceeds a threshold value (e.g., 1 mm), the parameter adjustment module 340 adjusts one or more calibration parameters (e.g., imaging parameters) until the relative distance is less than the threshold value. For example, the parameter adjustment module 340 modifies one calibration parameter while keeping other calibration parameters fixed to determine a value for the calibration parameter being modified resulting less than a threshold distance between the estimated position of an observed locator 120 and a position of its corresponding model locator. The parameter adjustment module 340 may then fix the calibration parameter to the determined value and repeat the process of modifying values for individual calibration parameters while keeping other calibration parameters at constant values until relative distances between adjusted estimated positions of at least a threshold number of observed locators 120 and positions of their corresponding model locators are less than the threshold value. Using the adjusted estimated positions of the observed locators 120, the parameter adjustment module 340 generates calibrated positions of the reference point 215 for one or more frames of the slow calibration data.

In embodiments where the VR headset 105 includes two rigid bodies (e.g., VR headset 225) the parameter adjustment module 340 determines a position of the rear rigid body 230 relative to the reference point 215 on the front rigid body 205. In some embodiments, the parameter adjustment module 340 identifies a rear reference point on the rear rigid body 230 using the observed locators 120 on the rear rigid body 230 and their corresponding model locators. The parameter adjustment module 340 then identifies a position of the rear reference point relative to the reference point 215 on the front rigid body 205. Alternatively, the VR console 110 identifies the position of each observed locator 120 on the rear rigid body 230 relative to the reference point 215 on the front rigid body 205. In some embodiments, the parameter adjustment module 340 generates the calibrated positions of the reference point 215 responsive to determining that a threshold number of locators are imaged (observed locators) on one or more sides of each rigid body 205, 230 or a threshold number of locators are imaged (observed locators) on all sides of each rigid body 205, 230. For example, the threshold number of locators imaged on a side of a rigid body 205, 230 is greater than or equal to zero. If the threshold number of locators is not imaged, the parameter adjustment module 340 may prompt the user via the VR headset 105 or via another suitable component to orient the VR headset 105 in a specific direction relative to the imaging device 135 or to continue moving the VR headset 105 until the threshold number of locators are imaged.

The parameter adjustment module 340 also determines a prediction function predicting positions of the reference point 215 and adjusts one or more calibration parameters until the intermediate estimated positions of the reference point 215 from the fast calibration data are within a threshold value of the predicted positions of the reference point 215. For example, the prediction function is generated by fitting a curve to the series of calibrated positions. The parameter adjustment module 340 then adjusts one or more calibration parameters until a distance between the intermediate estimated positions of the reference point 215 and the predicted positions of the reference point 215 is less than a threshold value. For example, the parameter adjustment module 340 may increase the sample rate of the IMU 140 until the distance between the intermediate estimated positions of the reference point 215 and the predicted positions of the reference point 215 is 1 mm or less. In other embodiments, the parameter adjustment module 340 adjusts one or more calibration parameters so distances between each intermediate estimated position and a calibrated position (e.g., $CP_1$) of the reference point 215 associated with the image is less than a distance value between the calibrated position (e.g., $CP_1$) of the reference point 215 associated with the image and the calibrated position of the reference point 215 associated with the subsequent image (e.g., $CP_2$).

In some embodiments, the parameter adjustment module 340 updates the initial position of the IMU 130 to be the next calibrated position of the reference point 215. As discussed above in conjunction with FIG. 1 and below in conjunction with FIG. 6, the IMU 130 collects fast calibration data relative to positions of the reference point 215 previously determined by the IMU 130. Accordingly, drift error increases the longer the IMU 130 collects data without updating the initial position to a calibrated position. The parameter adjustment module 340 compares the intermediate estimated positions with an update threshold value. If one or more of the intermediate estimated positions exceed the update threshold value, the parameter adjustment module 340 communicates an instruction to the IMU 130 to update the initial position as the position associated with the next calibrated position. Alternatively, after determining a calibrated position, the parameter adjustment module 340 instructs the IMU 130 to update the initial position to the determined calibrated position. The parameter adjustment module 340 stores the values for the adjusted calibration parameters in the tracking database 310 and may also provide the adjusted calibration parameters to other components in the VR console 110.

The monitoring module 350 monitors the system environment 100 for loss of calibration. In various embodiments, the monitoring module 350 monitors the relative distances between adjusted estimated positions of the observed locators 120 and positions of their corresponding model locators. If a relative distance between an adjusted estimated position of an observed locator and a position of its corresponding model locator is less than a threshold value (e.g., 1 mm), the monitoring module 350 provides the calibrated position of the reference point 215 determined from the positions of the observed locators 120 to the VR engine 155. In contrast, if the relative distance between an observed locator and its corresponding model locator is more than the threshold value (e.g., 1 mm), the monitoring module 350 determines that calibration is lost and prompts the parameter adjustment module 340 to re-calibrate the system environment 100.

To monitor relative distances determined by the parameter adjustment module 340 between intermediate estimated positions and their corresponding predicted positions. If a distance between a predicted position and its corresponding intermediate estimated position is less than a threshold value (e.g., 1 mm), the monitoring module 350 provides the intermediate estimated position to the VR engine 155. In some embodiments, the monitoring module 350 may also provide intermediate velocity information or intermediate acceleration information extracted from the fast calibration data to the VR engine 155. In contrast, if the distance between the predicted position and its corresponding intermediate estimated position is more than the threshold value, the monitoring module 350 determines that calibration is lost and causes the system environment 100 to re-establish calibration.

In some instances, locators 120 on the rear rigid body 230 are only visible to the imaging device 135. When only locators 120 on the rear rigid body 230 are visible to the imaging device 135, in some embodiments, if a difference between estimated position of the rear rigid body 230 (e.g., generated from the observed locators 120 on the rear rigid body 230) and a predicted position of the rear rigid body 230 (e.g., may be generated using fast calibration data) is greater than a threshold value, the monitoring module 350 determines calibration has been lost and causes the system environment 100 to re-establish calibration. Additionally, if the difference between estimated position of the rear rigid body 230 and the predicted position of the rear rigid body 230 is greater than the threshold value, the VR console 110 adjusts the predicted position of the rear rigid body 230 by a temporary offset value so the difference between the estimated position of the rear rigid body 230 and the predicted position of the rear rigid body 230 is less than the threshold value. The monitoring module 350 may then use the temporary offset value (or subsequently generated temporary offset values) to more accurately predict the position of the rear rigid body 230 until re-calibration may occur between the front rigid body 205 and the rear rigid body 230. Alternatively, if a difference between estimated positions of the locators 120 on the rear rigid body 230 and positions of their corresponding model locators, relative to the reference point 215, is greater than a threshold value, the monitoring module 350 determines calibration has been lost and causes the system environment 100 to re-establish calibration. In some embodiments, when the slow calibration data includes an image including a threshold number of locators on the front rigid body 205 and a threshold number of locators on the rear rigid body 230, the tracking module 150 begins re-calibration. Additionally, in some embodiments, once tracking is lost, the monitoring module 350 automatically prompts the user to adjust the VR headset 105 so locators on both the front rigid body 205 and the rear rigid body 230 are visible.

Calibrating Virtual Reality Systems

Figure 4:
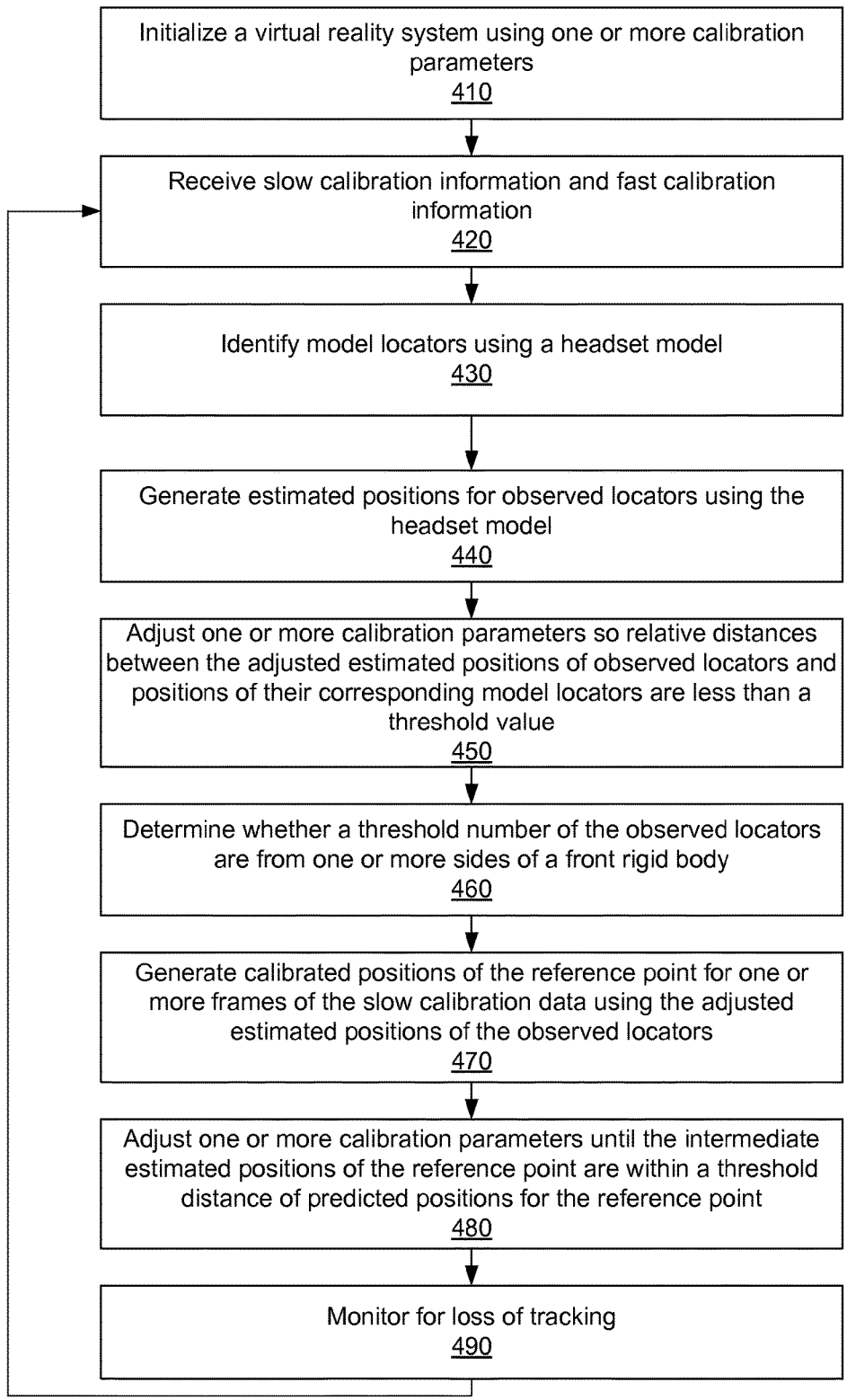
FIG. 4 is a flowchart of a process for calibrating a virtual reality system, in accordance with an embodiment.

FIG. 4 is a flowchart of one embodiment of a process for calibrating a VR system, such as the system environment 100 described above in conjunction with FIG. 1. In other embodiments, the process includes different, additional, or fewer steps than those depicted by FIG. 4. Additionally, in some embodiments, the steps described in conjunction with FIG. 4 may be performed in different orders.

The VR console 110 initializes 410 the system environment using one or more calibration parameters. For example, the VR console 110 retrieves one or more calibration parameters associated with the VR headset 105 from the tracking database 310. In some embodiments, the VR console 110 retrieves adjusted calibration parameter values from the tracking database 310 if the imaging device 135 or the IMU 130 were previously calibrated for a particular VR headset 105. If the imaging device 135 or the IMU 130 were not previously calibrated to the VR headset 105, the VR console 110 retrieves default calibration parameters from the tracking database 310. The VR console 110 provides the calibration parameters to the IMU 130 or to the imaging device 135.

The VR console 110 receives 420 slow calibration data from the imaging device 135 and fast calibration data from the IMU 130. The slow calibration data includes a series of images including one or more of the locators 120 on the VR headset 105. A locator 120 included in an image from the slow calibration data is referred to herein as an "observed locator." The fast calibration data may include one or more intermediate estimated positions of the reference point 215 (e.g., a center of the IMU 130). In other embodiments, the fast calibration data includes intermediate acceleration information and/or intermediate velocity information from which the VR console 110 determines one or more intermediate estimated positions of the reference point 215.

Based at least in part on the slow calibration data and a headset model, the VR console 110 identifies 430 model locators, which are locators in the headset model. The VR console 110 extracts locator information describing positions of observed locators 120 relative to each other in the from the slow calibration data and compares the locator information with a headset model retrieved from the tracking database 310 to identify 430 model locators that correspond to the observed locators. The model locators are components of the headset model, so identifying 430 a model locator associated with an observed locator allows the VR console 110 to subsequently compare a position of the observed locator with the ideal position, from the headset model of the model locator associated with the observed locator.

Using the headset model, the VR console 110 generates 440 estimated positions for one or more of the observed locators 120. The headset model describes ideal positioning between the locators 120 and the reference point 215. In various embodiments, the VR console 110 uses the headset model and the locator information to determine a projection matrix for translating ideal positions in the headset model to positions on an image plane of the imaging device 135. The VR console 110 uses the projection matrix to estimate positions of the observed locations. Hence, the estimated position of an observed locator 120 identifies an ideal position of the observed locator 120 on the image plane of the images from the slow calibration data.

Based at least in part on relative distances between estimated positions of one or more observed locators 120 and the positions of the model locators corresponding to the one or more observed locators 120, the VR console 110 adjusts 450 one or more calibration parameters that adjust the estimated positions of the one or more locators 120 so a relative distance between estimated positions of observed locators 120 and positions of their corresponding model locators from the headset model are less than a threshold value (e.g., 1 mm). Adjusting calibration parameters affects the projection matrix (e.g., changing focal length, etc.), so changing one or more calibration parameters may affect the estimated positions of the observed locators 120. If the distances between the estimated positions of the observed locators 120 and the positions of their corresponding model locators equals or exceeds the threshold value, in one embodiment, the VR console 110 adjusts 450 one calibration parameter while keeping other calibration parameters fixed to determine a value for the calibration parameter being adjusted that results in a distance between the estimated position of an observed locator 120 and the position of its corresponding model locator being less than the threshold value. The calibration parameter may then be fixed to the determined value, while another calibration parameter is modified so the distance between an estimated position of an additional locator 120 and an additional position of a model locator corresponding to the additional locator is less than the threshold value. Various calibration parameters may be adjusted 450 as described above so relative distances between adjusted estimated positions of at least a threshold number of observed locators 120 and positions of their corresponding model locators are less than the threshold value. If the distances between estimated positions of at least a threshold number of the observed locators 120 and positions of their corresponding model locators are less than the threshold value, the calibration parameters are not adjusted 450.

The VR console 110 determines 460 whether a threshold number of the observed locators 120 are from each side of the front rigid body 205 (i.e., the front side 220A, the top side 220B, the bottom side 220C, the right side 220C, and the left side 220D). If the threshold number of observed locators 120 are associated with each side, the VR console 110 generates 470 calibrated positions of the reference point 215 for one or more frames of the slow calibration data using the adjusted estimated positions of the observed locators. In embodiments where the VR headset 105 includes multiple rigid bodies, the VR console 110 generates the calibrated positions of the reference point 215 responsive to determining that a threshold number of locators are imaged (observed locators) on one or more sides of each rigid body 205, 230 or responsive to determining that a threshold number of locators are imaged (observed locators) on all sides of each rigid body 205, 230. If the threshold number of observed locators 120 are not associated with each side, the VR console 110 may communicate a prompt to the user via the VR headset 105 or another component to reposition the VR headset 105 so that slow calibration data including locators from one or more sides of the VR headset 150 may be captured.

The VR console 110 further adjusts 480 one or more calibration parameters until intermediate estimated positions of the VR headset 105 received from the fast calibration data are within a threshold distance of predicted positions for the VR headset 105 or the reference point 215, where the predicted positions are determined from the calibrated positions of the reference point 215 associated with various images from the slow calibration data. In some embodiments, the VR console 110 determines a predicted position of the reference point 215 by generating (e.g., via curve fitting) a prediction function using calibrated positions of the reference point 215 associated with different images from the slow calibration data. The VR console 110 adjusts one or more of the calibration parameters until the distances between the intermediate estimated positions of the reference point 215 and the predicted positions of the reference point 215 are less than a threshold distance. For example, the VR console 110 may increase the sample rate of the IMU 130 until the distances between the intermediate estimated positions of the reference point 215 and the predicted positions of the reference point 215 are all 1 mm or less or until distances between at least a threshold number of intermediate estimated positions of the reference point 215 and predicted positions of the reference point 215 are less than 1 mm. In other embodiments, the VR console 110 determines a predicted position of the reference point 215 as a position between a calibrated position of the reference point 215 associated with an image from the slow calibration data and a calibrated position of the reference point 215 associated with a subsequent image from the slow calibration data. The VR console 110 then adjusts 480 one or more calibration parameters so distances between each intermediate estimated position and a calibrated position (e.g., $CP_1$) of the reference point 215 associated with the image is less than a distance between the calibrated position (e.g., $CP_1$) of the reference point 215 associated with the image and the calibrated position of the reference point 215 associated with the subsequent image (e.g., $CP_2$). Additionally, the VR console 110 may update the initial position of the IMU 130 to be the calibrated position of the reference point 215.

In some embodiments, the VR console 110 stores the values for the adjusted calibration parameters in the tracking database 310 or provides the values for the adjusted calibration parameters to other components in the VR console 110. The adjusted calibration values may reduce calibration times for subsequent operations of the system environment 100, improving user experience.

The VR console 110 monitors 490 the system environment 100 for loss of calibration. For example, the VR console 110 monitors the relative distances between adjusted estimated positions of the observed locators 120 and positions of their corresponding model locators. If a relative distance between an adjusted estimated position of an observed locator 120 and a position of its corresponding model locator is less than a threshold value (e.g., 1 mm), the VR console 110 provides the calibrated position to the VR engine 155. In contrast, if the relative distance between an estimated position of an observed locator and a position of its corresponding model locator is greater than (or equals or exceeds) than the threshold value (e.g., 1 mm), the VR console 110 determines that calibration is lost, receives 420 slow calibration data and fast calibration data and performs the above-identified functions to re-calibrate the system environment 110.

Additionally, the VR console 110 monitors 490 the relative distances between intermediate estimated positions of the reference point 215 and predicted positions of the reference point 215. For example, if a distance between a curve of predicted positions of the reference point 215 and an intermediate estimated position of the reference point 215 is less than a threshold distance (e.g., 1 mm), the VR console 110 provides the intermediate estimated position to the VR engine 155. In some embodiments, the VR console 110 may also provide intermediate velocity information or intermediate acceleration information extracted from the fast calibration data to the VR engine 155. In contrast, if the distance between the predicted position of the reference point 215 and an intermediate estimated position of the reference point 215 is greater than or equals or exceeds the threshold distance, the VR console 110 determines that calibration is lost, receives 420 slow calibration data and fast calibration data and performs the above-identified functions to re-calibrate the system environment 100.

In some embodiments, the IMU 130 and the imagining device 135 may be calibrated simultaneously. To simultaneously calibrate the IMU 130 and the imaging device 135, the VR console 110 estimates positions of the reference point 215 for a series of images using estimated positions of the observed locators. Additionally, the VR console 110 uses fast calibration data including the intermediate estimated positions of the reference point 215 at particular time values corresponding to images in the slow calibration data when calibrating the IMU 130 and the imaging device 135. When simultaneously adjusting calibration parameters of the IMU 130 and of the imaging device 135, the VR console 110: (1) adjusts estimated positions of observed locators so a relative distance between the adjusted estimated positions of the observed locators and positions of their corresponding model locators are less than a threshold value; and (2) adjusts the estimated positions for the reference point so a relative distance between the estimated positions for the reference point at the particular time values corresponding to images in the slow calibration data and the positions of a model reference point determined from the model locators is less than the threshold value.

Figure 5:
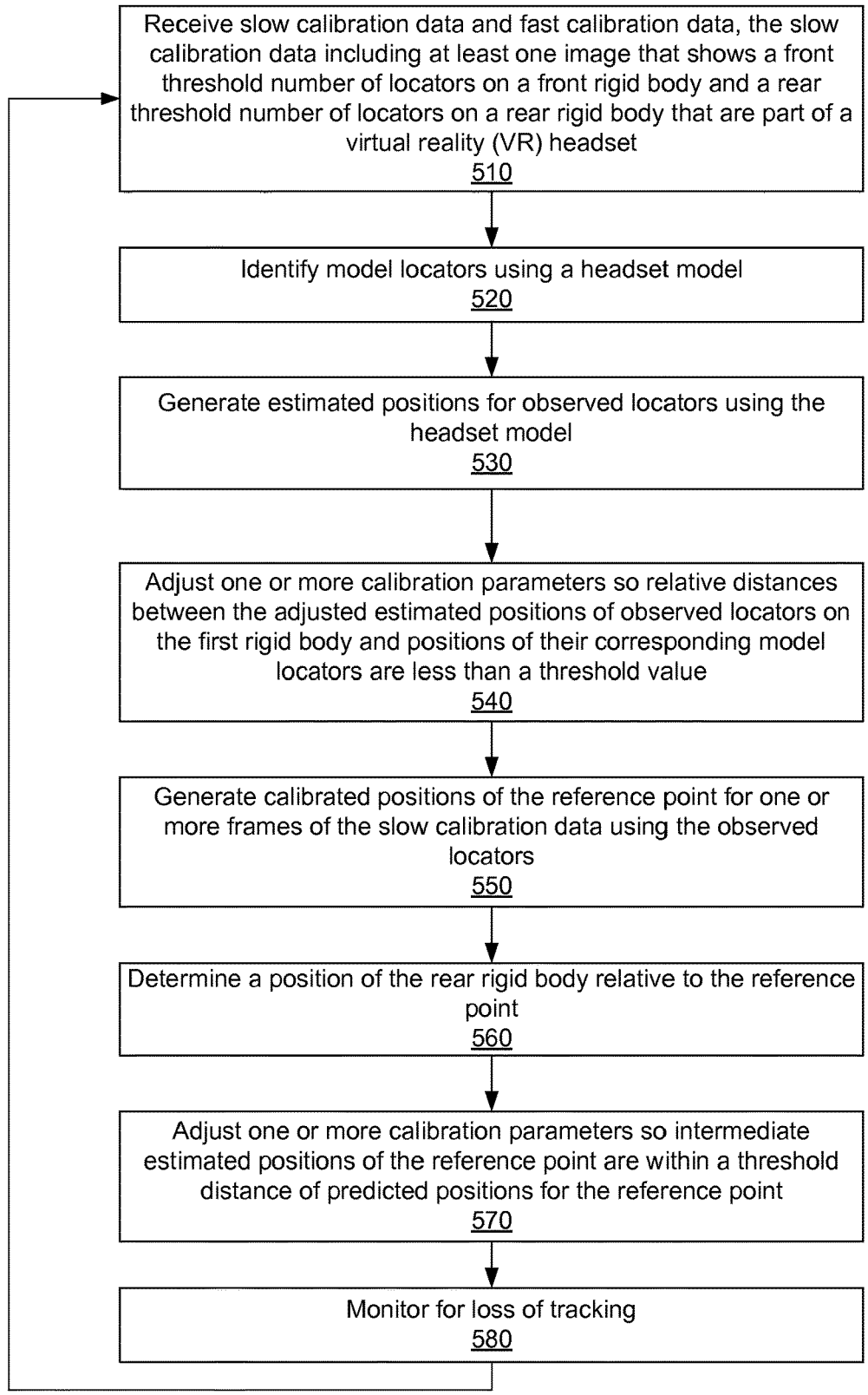
FIG. 5 is a flowchart of a process for re-establishing calibration between two rigid bodies in a virtual reality headset included in a virtual reality system, in accordance with an embodiment.

FIG. 5 is a flowchart illustrating one embodiment of a process for re-establishing calibration between two rigid bodies of a virtual reality headset 225 included in the system environment 100. In other embodiments, the process includes different, additional, or fewer steps than those depicted by FIG. 5. Additionally, in some embodiments, the steps described in conjunction with FIG. 5 may be performed in different orders.

The VR console 110 receives 510 slow calibration data including images showing a front threshold number of locators 120 on a front rigid body 205 and a rear threshold number (e.g., at least one) of locators 120 on a rear rigid body 230 of the VR headset 225. A locator 120 included in an image from the slow calibration data is referred to herein as an "observed locator." As described above in conjunction with FIGS. 2-4, the VR console 110 receives 150 the slow calibration data from the imaging device 135 and the fast calibration data from the IMU 130. The fast calibration data may also include intermediate acceleration information and/or intermediate velocity information from which the VR console 110 determines one or more intermediate estimated positions of the reference point 215 of the VR headset 225.

Based at least in part on the slow calibration data and a headset model, the VR console 110 identifies 520 model locators, which are locators in the headset model. The VR console 110 extracts locator information describing positions of observed locators 120 relative to each other from the slow calibration data and compares the locator information with a headset model retrieved from the tracking database 310 to identify 520 model locators that correspond to the observed locators 120. In at least one of the images model locators are identified that correspond to observed locators on both the front rigid body 205 and the rear rigid body 230 of the VR headset 225. The model locators are components of the headset model, so identifying 520 a model locator associated with an observed locator allows the VR console 110 to subsequently compare a position of the observed locator with the ideal position, from the headset model of the model locator associated with the observed locator.

Using the headset model, the VR console 110 generates 530 estimated positions for one or more of the observed locators 120. The headset model describes ideal positioning between the locators 120 and the reference point 215. In various embodiments, the VR console 110 uses the headset model and the locator information to determine a projection matrix for translating ideal positions in the headset model to positions on an image plane of the imaging device 135. The VR console 110 uses the projection matrix to estimate positions of the observed locators 120. Hence, the estimated position of an observed locator 120 identifies an ideal position of the observed locator 120 on the image plane of the images from the slow calibration data.

Based at least in part on relative distances between estimated positions of one or more observed locators 120 and the positions of the model locators corresponding to the one or more observed locators 120, the VR console 110 adjusts 540 relative distance between estimated positions of observed locators on the first rigid body 205 and positions of their corresponding model locators are less than a threshold value (e.g., 1 mm). Adjusting calibration parameters affects the projection matrix (e.g., changing focal length, etc.), so changing one or more calibration parameters may affect the estimated positions of the observed locators 120. If the distances between the estimated positions of the observed locators 120 and the positions of their corresponding model locators equals or exceeds the threshold value, in one embodiment, the VR console 110 adjusts 540 one calibration parameter while keeping other calibration parameters fixed to determine a value for the calibration parameter being adjusted that results in a distance between the estimated position of an observed locator 120 and the position of its corresponding model locator being less than the threshold value. Adjustment 540 of calibration parameters is further described above in conjunction with FIG. 4. If the distances between estimated positions of at least a threshold number of the observed locators 120 and positions of their corresponding model locators are less than the threshold value, the calibration parameters are not adjusted 540.

After adjusting 540 calibration parameters so at least a threshold number of relative distances between the estimated positions of the observed locators and the positions of their corresponding model locators are less than the threshold value, the VR console 110 generates 550 calibrated positions of the reference point 215 associated with one or more images of the slow calibration data using the adjusted estimated positions of the observed locators 120. In some embodiments, the VR console 110 generates the calibrated positions of the reference point 215 responsive to determining that a threshold number of locators are imaged (observed locators) on one or more sides of each rigid body 205, 230 or determining that a threshold number of locators are imaged (observed locators) on all sides of each rigid body 205, 230. If the threshold number of locators (on a side of a rigid body 205, 230 or on all sides of each rigid body 205, 230) is not imaged, the VR console 110 may prompt the user via the VR headset 105 or via another suitable component to orient the VR headset 105 in a specific direction relative to the imaging device 135 or to continue moving the VR headset 105 until the threshold number of locators are imaged.

The VR console 110 also determines 560 a position of the rear rigid body 230 relative to the reference point 215. In some embodiments, the VR console 110 identifies a rear reference point on the rear rigid body 230 using the observed locators 120 and their corresponding model locators. The VR console 110 then identifies the position of the rear reference point relative to the reference point 215 on the front rigid body 205 such that the rear reference point is positioned relative to the reference point 215 by a position vector. Alternatively, the VR console 110 identifies the position of each observed locator on the rear rigid body 230 relative to the reference point 215, so positions of each observed locator on the rear rigid body 230 are positioned relative to the reference point 215 by their own position vector.

The VR console 110 adjusts 570 one or more calibration parameters so the intermediate estimated positions of the reference point 215 are within a threshold distance of predicted positions of the reference point 215. Adjustment of calibration parameters so intermediate estimated positions of the reference point 215 are within a threshold value of predicted positions of the reference point is further described above in conjunction with FIG. 4. After adjusting 570 one or more calibration parameters, the VR console 110 monitors 580 for loss of calibration of the system environment 100, as described above in conjunction with FIG. 4.

When monitoring 580 for loss of calibration, the VR console 110 uses images from the slow calibration data that may include observed positions of locators 120 on the first rigid body 205, on the rear rigid body 230, or on some combination thereof. In some embodiments, the threshold value between a position of an observed locator 120 and a position of its corresponding model locator may differ based on the rigid body on which the observed locator 120 is located. For example, the threshold value may be 1 mm for observed locators 120 on the front rigid body 205 and 2 mm for observed locators 120 on the rear rigid body 230.

Additionally, in some scenarios, the imaging device 135 is unable to view locators 120 on the front rigid body 205, but is able to view locators on the rear rigid body 230. In these scenarios, tracking is monitored using the process described below with respect to FIG. 6.

When the slow calibration data includes an image including a threshold number of locators on the front rigid body 205 and a threshold number of locators on the rear rigid body 230, the steps described above in conjunction with FIG. 5 are repeated to re-establish calibration of the system environment 100. In some embodiments, when tracking is lost, the VR console 110 automatically prompts the user to adjust the VR headset 105 so locators on both the front rigid body 205 and on the rear rigid body 230 are visible to the imaging device 135. The prompt presented to the user may provide the user with specific instructions to position the VR headset 105 so locators on both the front rigid body 205 and on the rear rigid body 230 are visible to the imaging device 135.

Figure 6:
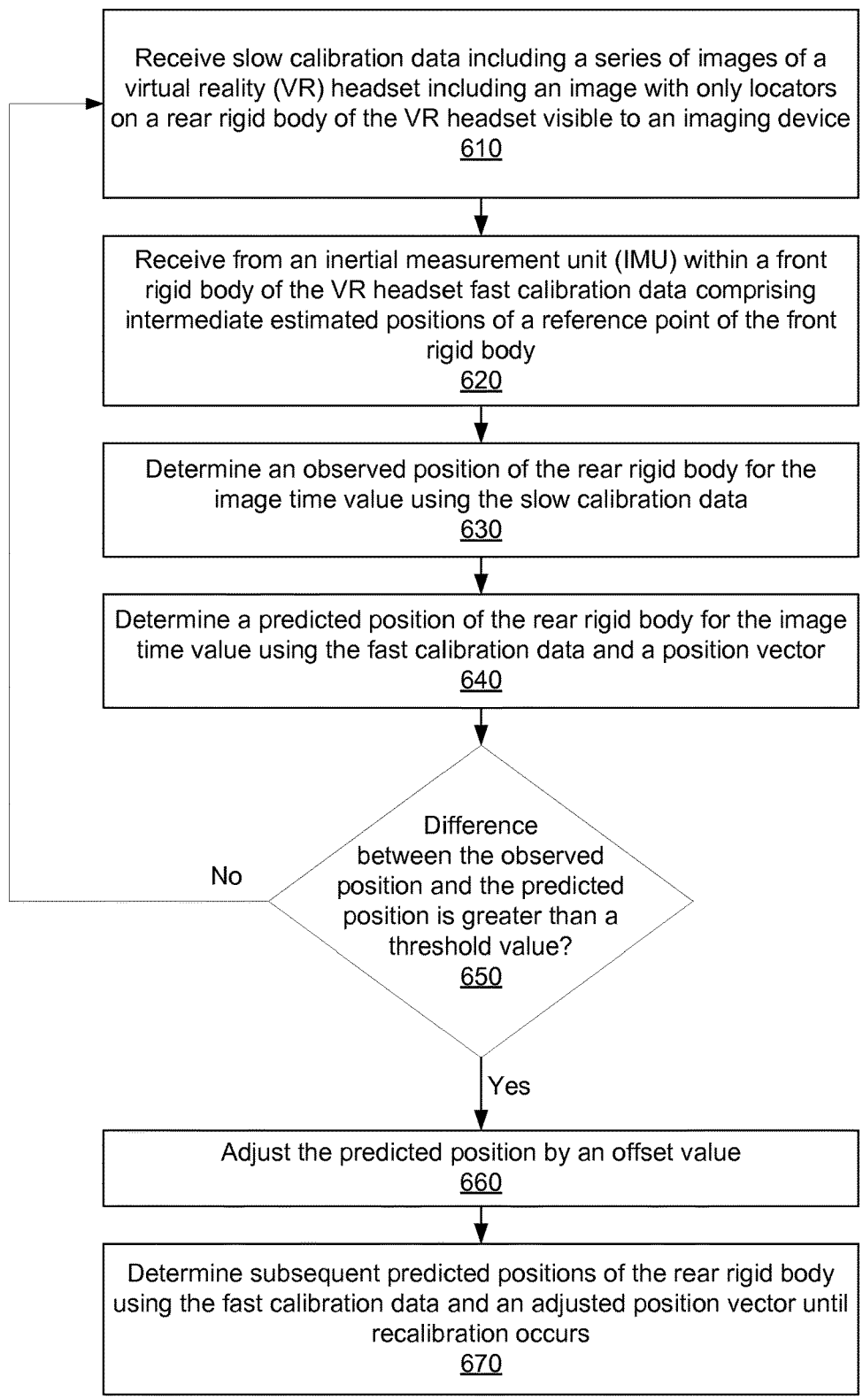
FIG. 6 is a flowchart of a process of maintaining a positional relationship between two rigid bodies in a virtual reality headset included in a virtual reality system, in accordance with an embodiment.

FIG. 6 is a flowchart illustrating one embodiment of a process for maintaining a positional relationship between two rigid bodies of a virtual reality headset 225 included in the system environment 100. In other embodiments, the process includes different, additional, or fewer steps than those depicted by FIG. 6. Additionally, in some embodiments, the steps described in conjunction with FIG. 6 may be performed in different orders.

The VR console 110 receives 610 slow calibration data from the imaging device 135. The slow calibration data includes a series of images that includes an image associated with an image time value and having only observed locators 120 on the rear rigid body 230 visible to the imaging device 135. An image time value is a time value when the image was captured by the imaging device 135. Additionally, the VR console 110 receives 620, from the IMU 130, fast calibration data that includes intermediate estimated positions of a reference point 215 for a series of time values that includes the image time value.

Based on the slow calibration data, the VR console 110 determines 630 an observed position of the rear rigid body 230 at the image time value. To determine 620 the observed position of the rear rigid body 230, the VR console 110 extracts locator information describing positions of observed locators 120 on the rear rigid body 230 relative to each other from the slow calibration data and compares the locator information with a headset model retrieved from the tracking database 310 to identify model locators corresponding to the observed locators 120. After identifying model locators, the VR console 110 determines the observed locators 120 corresponding to each model locator and determines a rear reference point for the rear rigid body 230 using the positions of the observed locators 120. In some embodiments, the observed position of the rear rigid body 230 is the position of the rear reference point. In alternate embodiments, the observed position of the rear rigid body 230 may be observed positions of one or more of the observed locators.

The VR console 110 determines 640 a predicted position of the rear rigid body 230 at the image time value using the fast calibration data and a position vector. The position vector describes a calibrated offset between the front rigid body 205 and the rear rigid body 230. For example, the position vector describes a calibrated offset between the reference point 215 associated with the front rigid body 205 and a rear reference point associated with the rear rigid body 230. Additionally, in some embodiments, the position vector may include one or more sub-vectors that each describe relative calibrated offsets between the reference point 215 and different locators on the rear rigid body 230.

From the fast calibration data, the VR console 110 determines an intermediate estimated position of the reference point 215 on the front rigid body 205. In some embodiments, the VR console 110 determines the predicted position of the rear rigid body 230 as a position relative to the position of the reference point 215 based on the position vector. For example, the position vector identifies a relative positioning of a rear reference point on the rear rigid body 230 to the reference point 215. Alternatively, the position vector identifies the relative positioning of one or more locators 120 (including the observed locators) on the rear rigid body 230 relative to the reference point 215.

The VR console 110 determines 650 whether a difference between the observed position and the predicted position is greater than a threshold value (e.g., 1 mm). If the difference is less than the threshold value, tracking of the VR headset 225 is maintained and slow calibration data is received 610, and the process proceeds as described above. However, if the difference between the observed position of the rear rigid body 230 exceeds the threshold value, the VR console 110 determines tracking of the VR headset 105 is lost and adjusts 660 the predicted position by an offset value. The offset value is determined so the difference between the between the observed position of the rear rigid body 230 and the predicted position of the rear rigid body 230 is less than the threshold value. For example, the VR console 110 uses the position vector modified by the offset value to more accurately determine the position of the rear rigid body 230 from the fast calibration data. Alternatively, the VR console 110 communicates an instruction to the IMU 130 to offset the estimated intermediate positions based on the offset value without modifying the position vector.

Based on the fast calibration data and the adjusted vector, the VR console 110 determines 670 subsequent predicted positions of the rear rigid body until re-calibration occurs (e.g., as further described above with respect to FIG. 5). In some embodiments, when tracking is lost, the VR console 110 prompts the user to adjust the VR headset 105 so locators on both the front rigid body 205 and on the rear rigid body 230 are visible to the imaging device 135. The prompt presented to the user may provide the user with specific instructions to position the VR headset 105 so locators on both the front rigid body 205 and on the rear rigid body 230 are visible to the imaging device 135 to facilitate re-calibration described in detail above with reference to FIG. 5.

Figure 7:
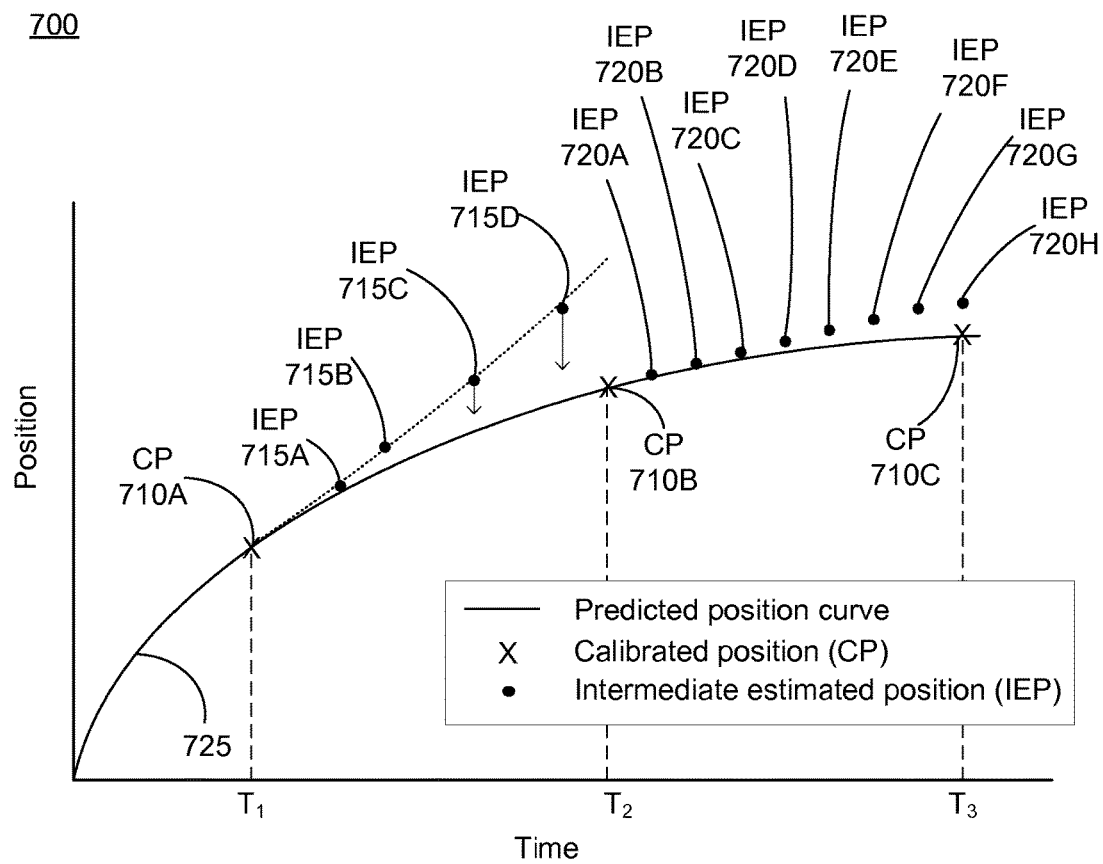
FIG. 7 is an example graph illustrating a series of calibrated positions of a virtual reality headset, in accordance with an embodiment.

FIG. 7 illustrates an example graph 700 illustrating a series of calibrated positions of a virtual reality headset 105. In FIG. 7, the vertical axis represents position, and the horizontal axis represents time. The graph 700 includes a series of calibrated positions 710A-C of a reference point of the VR headset 105 at times, $T_1$, $T_2$, and $T_3$, respectively. The graph 700 also includes a series of intermediate estimated positions 715A-D and 720A-H of the reference point. The calibrated positions 710A-C are generated using slow calibration data from an imaging device 135 and the intermediate estimated positions 715A-D and 720 A-H are generated using fast calibration data from an IMU 130 included on a VR headset 105. Note, the relative times scales of the calibrated positions 710A-C and of the intermediate estimated positions 715A-D are different, and that intermediate estimated positions 715A-D and 720A-H are determined more frequently than the calibrated positions 710A-C.

The graph 700 shows a predicted position curve 725 described by a prediction function describing the predicted position of the reference point. The prediction function is generated by fitting a curve to the calibrated positions 710A-C and determining a function that describes the fitted curve. Any suitable method may be used to determine the position function from the calibrated positions 710A-C.

In the example of FIG. 7, the intermediate estimated positions 715A-D are the initial intermediate estimated positions determined using the fast calibration data prior to adjustment of the calibration parameters. Intermediate estimated position 715A is relatively close to the predicted position curve in FIG. 7, but as time progresses, the intermediate estimated positions move farther away from the predicted position curve 725, with the intermediate estimated position 715D in FIG. 7 being the farthest from the predicted position curve 725. The difference between the predicted position curve and the intermediate estimated position may be attributed to a combination of actual user movements, drift error, as well as additional factors. As discussed above, because the IMU 130 determines an intermediate estimated position relative to a previously determined position, the error compounds, resulting in larger deviation between the predicted position curve 725 and intermediate estimated positions 15 over time. To account for drift error, the VR console 110 may update an initial position of the IMU 130 as the subsequent calibration position. The IMU 130 then generates fast calibration with respect to the updated initial position and intermediate estimated positions determined after the initial position. In this embodiment, the VR console 110 updates the initial point as the calibrated position 710B.

Another way to reduce error associated with the intermediate estimated positions is by increasing the frequency that the intermediate estimated positions are determined. In the example of FIG. 7, the VR console 110 determined the intermediate estimated positions 720 A-H at twice the frequency of the intermediate estimated positions 715 A-D, resulting in a smaller difference between the intermediate estimated positions 720 A-H and the predicted position curve 725.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display (HMD) comprising:
    an electronic display configured to present content to a user of the HMD;
    a front rigid body comprising the electronic display and a first plurality of locators located at different positions on the front rigid body;
    a rear rigid body that is non-rigidly coupled to the front rigid body, the rear rigid body comprising a second plurality of locators located at different positions on the rear rigid body;
    an elastic band configured to elastically couple the front rigid body and the rear rigid body; and
    an inertial measurement unit (IMU) configured to output fast calibration data comprising one or more intermediate estimated positions of a reference point on the HMD, each intermediate estimated position separated from a subsequent intermediate estimated position by a position time value.

2. The HMD of claim 1, wherein the IMU includes a three-axis gyroscope to measure angular velocity.

3. The HMD of claim 1, wherein the IMU includes a three-axis accelerometer.

4. The HMD of claim 1, wherein the IMU includes a three-axis magnetometer.

5. The HMD of claim 1, wherein the first plurality of locators are arranged in a pattern on the front rigid body that is non-coplanar, and the second plurality of locators are arranged in a pattern on the rear rigid body that is non-coplanar.

6. The HMD of claim 1, wherein the first plurality of locators and the second plurality of locators are light emitting diodes (LEDs).

7. The HMD of claim 6, wherein the LEDs are modulated to maintain one out of two or more predetermined brightness levels during a time interval.

8. The HMD of claim 7, wherein the modulation of the LEDs is selected from a group consisting of: amplitude modulation, frequency modulation, and a combination thereof.

9. The HMD of claim 6, wherein the LEDs emit light within a specific band selected from a group consisting of a visible band and an infrared band.

10. The HMD of claim 9, wherein the first and the second plurality of locators emit in the infrared band and an outer surface of the HMD is transparent in the infrared band but opaque in the visible band.

11. The HMD of claim 1, further comprising wherein the HMD is part of a system that comprises:
    an imaging device configured to output slow calibration data including a series of images showing portions of observed locators of the first and the second plurality of locators, on the HMD, each image separated from a subsequent image in the series by an image time value that is larger than the position time value; and
    a console comprising:
        a processor, and
        a memory coupled to the processor and including instructions that, when executed by the processor, cause the processor to:
            receive the slow calibration data from the imaging device,
            receive the fast calibration data from the HDM,
            identify model locators each corresponding to a locator on the HMD and included in at least one image from the slow calibration data using a stored headset model associated with the HMD,
            generate estimated positions of one or more of the locators on the HMD and included in at least one image from the slow calibration data using the headset model,
            adjust one or more calibration parameters to adjust the estimated positions so a relative distance between the adjusted estimated positions of one or more of the locators on the HMD and included in at least one image from the slow calibration data and positions of their corresponding model locators are less than a threshold value,
            generate calibrated positions of the reference point based at least in part on the adjusted estimated positions of one or more of the locators on HMD and included in at least one image from the slow calibration data, a calibrated position associated with an image from the slow calibration data,
            determine one or more predicted positions of the reference point based at least in part on the calibrated positions of the reference point, a predicted position associated with a time between subsequent images from the slow calibration data, and
            adjust one or more of the calibration parameters so the intermediate estimated positions of the reference point are within a threshold distance of the determined predicted positions of the reference point.

12. The HMD of claim 11, wherein the instructions executed by the processor, further cause the processor to:
    receive slow calibration data from the imaging device;
    receive the fast calibration data from the IMU;
    determine an observed position of the rear rigid body for the particular image time value using the slow calibration data;
    determine a predicted position of the rear rigid body for the particular image time value using the fast calibration data and a position vector describing a calibrated offset between the front rigid body and the rear rigid body;
    determine that a difference between the observed position and the predicted position is greater than a threshold value;
    responsive to a determination that a difference between the observed position of the rear rigid body and the predicted position of the rear rigid body is greater than a threshold value, adjust the position vector by an offset value so the difference between the observed position and the predicted position is less than the threshold value; and
    determine a subsequent predicted position of the rear rigid body for an image from the series of images associated with a subsequent image time value occurring after the image time value based on the fast calibration data and the adjusted position vector.

13. The HMD of claim 1, wherein the IMU is located within the front rigid body.

14. The HMD of claim 1, wherein the elastic band includes one or more locators.

15. A virtual reality (VR) system comprising:
a head-mounted display (HMD) comprising:
an electronic display configured to present content to a user of the HMD,
a front rigid body comprising the electronic display and a first plurality of locators located at different positions on the front rigid body;
a rear rigid body that is non-rigidly coupled to the front rigid body, the rear rigid body comprising a second plurality of locators located at different positions on the rear rigid body, an elastic band configured to elastically couple the front rigid body and the rear rigid body; and
an inertial measurement unit (IMU) configured to output fast calibration data comprising one or more intermediate estimated positions of a reference point on the HMD, each intermediate estimated position separated from a subsequent intermediate estimated position by a position time value, and
an imaging device configured to output slow calibration data including a series of images showing portions of observed locators of the first and the second plurality of locators, on the HMD, each image separated from a subsequent image in the series by an image time value that is larger than the position time value.

16. The VR system of claim 15, wherein the plurality of locators are light emitting diodes (LEDs).

17. The VR system of claim 16, wherein the LEDs are modulated to maintain one out of two or more predetermined brightness levels during a time interval.

18. The VR system of claim 17, wherein the modulation of the LEDs is selected from a group consisting of: amplitude modulation, frequency modulation, and any combination thereof.

19. The VR system of claim 16, wherein the LEDs emit light within a specific band selected from a group consisting of a visible band and an infrared band.

20. The VR system of claim 19, wherein the first and the second plurality of locators emit in the infrared band and an outer surface of the HMD is transparent in the infrared band but opaque in the visible band.

* * * * *